Jan. 30, 1968   R. A. BINNS ET AL   3,365,803
FABRIC ELONGATION MEASURING DEVICE
Original Filed Feb. 12, 1965

INVENTORS
ROBERT A. BINNS
RONALD HORNE
JOHN L. MARSHALL, JR.
BY *Melvin L. Mitchell*
ATTORNEY

United States Patent Office 3,365,803
Patented Jan. 30, 1968

3,365,803
FABRIC ELONGATION MEASURING DEVICE
Robert A. Binns, Pensacola, Ronald Horne, Gonzales, and John L. Marshall, Jr., Pensacola, Fla., assignors to Monsanto Company, St. Louis Mo., a corporation of Delaware
Continuation of application Ser. No. 432,177, Feb. 12, 1965. This application Apr. 17, 1967, Ser. No. 631,566
1 Claim. (Cl. 33—147)

ABSTRACT OF THE DISCLOSURE

A device for measuring fabric elongation comprising a casing having a fabric engaging means fixed thereto and a dial indicator therein geared to the teeth of a rack slidably mounted in the casing and a fabric engaging means fixed to said rack. A lock means is adjustably mounted in the casing and carries a resilient pad engagable with the rack teeth to immobilize the latter.

---

Figure 1:
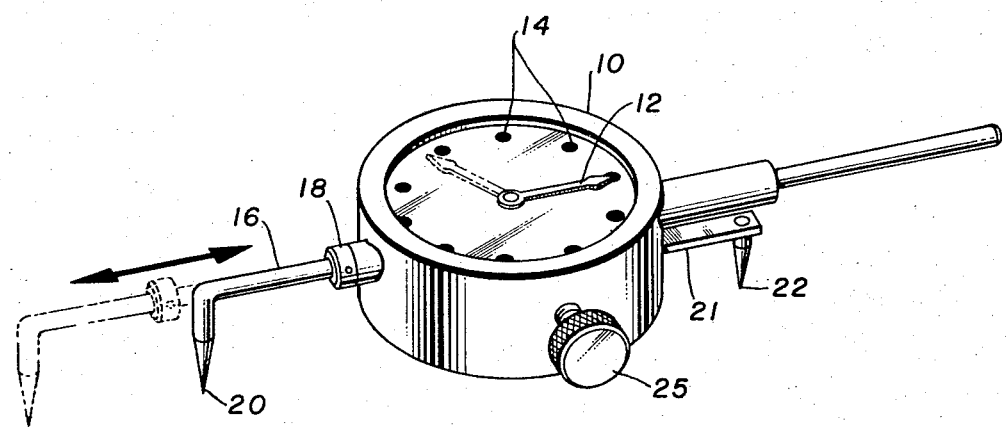

This application is a continuation of abandoned application Ser. No. 432,177 filed Feb. 12, 1965.

In many instances it is desirable to measure how much a fabric elongates when placed under tension. This information, for example, is of particular significance in fabric to be used for making automobile seat belts. Of course, there are numerous other instances wherein the elongation of a particular fabric is of interest.

There have been various methods developed for measuring fabric elongation. In general, these methods lack reproducibility between testers or testing machines. In one particular method for determining fabric elongation, the fabric is placed between two clamps adapted to place tension upon the fabric. Two marks a certain distance apart are placed upon the fabric while it is in the untensioned state. Then the fabric is stretched or elongated and the distance between the marks remeasured. The increase in distance is given as percent elongation, based on the initial distance between the marks. This method is subject to variations according to the distance between marks and operator technique.

Therefore, it is an object of this invention to produce an instrument that can be used to accurately and quickly determine percent fabric elongation.

Another object is to produce such an instrument wherein percent elongation can be read directly, thus eliminating any calculations.

Other objects will become apparent from the following descriptive material.

Figure 2:
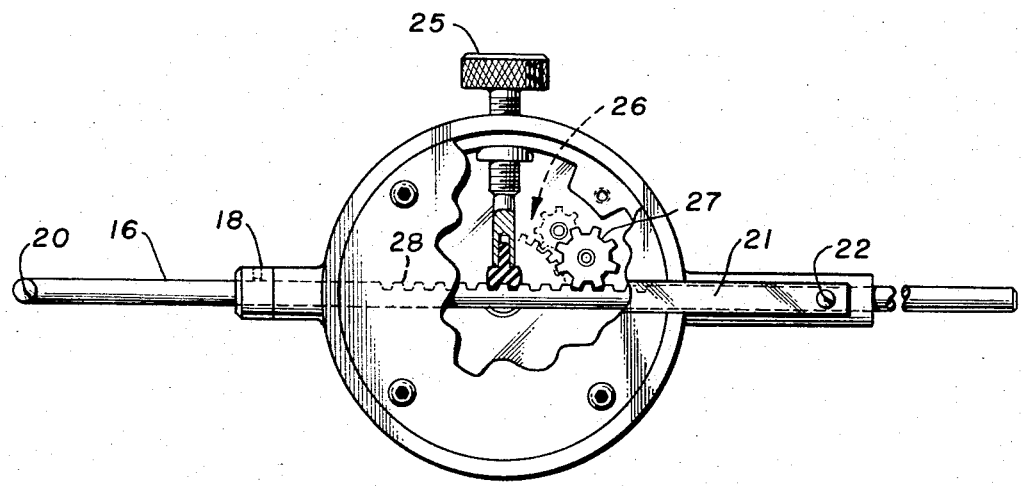

In the drawing:

FIGURE 1 is a perspective view of the preferred fabric elongation measuring device showing the spindle in the re-set position and (by dotted lines) in an extended position; and FIGURE 2 is a bottom plan view of the preferred fabric elongation measuring device with a portion of the bottom closure broken away.

In general and in accordance with FIGURE 1 of the drawing, the above objects are achieved in the provision of a fabric elongation measuring device including a frame 10 and a spindle 16 which has first and second ends. The spindle is slidably mounted for movement from a re-set position, wherein the first end of the spindle is near the frame, to extended positions, wherein the first end is further away from the frame. A first fabric engaging means 20 is on the spindle and a second fabric engaging means 22 is on the frame. The second fabric engaging means is a given distance from the first fabric engaging means when the spindle is in the re-set position. Dial indicator means are mounted on the frame for indicating the position of the first fabric engaging means with respect to the second fabric engaging means. The dial indicator includes a face having indicia 14 thereupon corresponding to percent of the given distance.

To better understand the invention, more particular reference should be made to FIGURE 1 wherein spindle or plunger 16, equipped with collar 18, is slidably mounted in frame 10. A dial indicator is mounted within frame 10 to indicate by means of indicia 14 and movable pointer 12 the displacement between needle points or pins 20 and 22 which are respectively mounted on spindle 16 and arm 21.

FIGURE 2 shows spindle 16 having rack 28 thereupon in engagement with pinion 27 which is in further engagement with gear train 26. Thumb screw 25 (shown in the engaged position) is threaded through a portion of frame 10 adjacent rack 28 for selective engagement therewith. The end of thumb screw 25 that contacts rack 28 has rubber mounted thereupon.

In operation, needle points 20 and 22 are forced into engagement with fabric in the untensioned state. When tension is applied to the fabric, needle points 20 and 22 are displaced with respect to one another. That is, spindle 16 is moved from the re-set position (solid line) to an extended position (dotted line). The movement of the spindle is transmitted from rack 28 through pinion 27 and gear train 26 to pointer 12. Pointer 12 is displaced (dotted line) with respect to indicia 14 in an amount corresponding to the displacement between needle points 20 and 22. Generally, the movement of the spindle is so amplified by gear train 26 that the corresponding movement of pointer 12 is greater than the displacement between needle points 20 and 22. Indicia 14 are marked off in percent graduations so that fabric elongation may be directly read in percent. The combination of the gear train for transmitting and amplifying the movement from pinion 27 to pointer 12, the pinion, the pointer, the spindle with rack thereupon, and the face with indicia thereupon is conventional and well known in the art and is usually called a dial indicator.

It is a generally desirable feature that one be able, once the spindle has been removed or extended from the re-set position, to immobilize it in such extended position. Thus one may be able to obtain a fabric elongation reading, immoblize the spindle and then remove the needle points from engagement with the fabric. One method for so immobilizing the spindle is illustrated by rubber tipped thumb screw 25. Once a reading is obtained thumb screw 25 is turned until the rubber tip or pad engages with the rack on spindle 16 thus preventing any movement thereof.

It is to be understood that any means for engaging the frame and the spindle with the fabric are equivalent to needle points 20 and 22 shown herein. Other methods for immobilizing the spindle should also be apparent to those skilled in the art.

The invention has been described by reference to a specific device; nevertheless, it should be broadly construed and should be only limited by the scope of the appended claim.

What is claimed is:

1. In a fabric elongation measuring device comprising a casing having a fabric engaging means fixed thereto and a dial percent elongation indicator housed therein geared to teeth of a rack slidably mounted within said casing and a fabric engaging means fixed to said rack and movable therewith, the improvement comprising, lock means adjustable towards and away from said rack within said casing and provided with a resilient pad engagable with said teeth of said slidable rack to immobilize the latter.

References Cited

UNITED STATES PATENTS 2,652,631  9/1953  Micksch _____ 33—147

FOREIGN PATENTS 56,896  12/1912  Austria.

SAMUEL S. MATTHEWS, *Primary Examiner.*